(12) United States Patent
Chung et al.

(10) Patent No.: US 7,653,038 B2
(45) Date of Patent: Jan. 26, 2010

(54) DUAL MAC ARBITRATION

(75) Inventors: Chia-Chun Chung, San Jose, CA (US); Ken Kinwah Ho, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 423 days.

(21) Appl. No.: 11/355,491

(22) Filed: Feb. 16, 2006

(65) Prior Publication Data

US 2007/0191042 A1 Aug. 16, 2007

(51) Int. Cl.
*H04W 4/00* (2006.01)

(52) U.S. Cl. .................. 370/338; 370/252; 370/329; 370/345; 370/412; 370/465; 709/223; 709/230; 709/232; 709/236; 709/250; 455/512; 455/525

(58) Field of Classification Search .............. 455/550.1, 455/552.1, 561, 525; 370/338, 319, 322, 370/321, 442, 443, 444, 445, 449, 461, 462, 370/328, 329, 431
See application file for complete search history.

(56) References Cited

U.S. PATENT DOCUMENTS

| | | | | |
|---|---|---|---|---|
| 5,568,476 | A * | 10/1996 | Sherer et al. ................ | 370/236 |
| 6,012,099 | A * | 1/2000 | Chung ........................ | 709/249 |
| 6,799,054 | B2 * | 9/2004 | Shpak ........................ | 455/525 |
| 7,421,273 | B2 * | 9/2008 | Diepstraten et al. ......... | 455/445 |
| 2003/0207698 | A1 | 11/2003 | Shpak | |
| 2004/0062258 | A1 * | 4/2004 | Grow et al. ................. | 370/412 |
| 2004/0196812 | A1 | 10/2004 | Barber | |
| 2006/0050729 | A1 * | 3/2006 | Chen et al. .................. | 370/450 |
| 2006/0268799 | A1 * | 11/2006 | Huang et al. ................ | 370/338 |
| 2007/0005675 | A1 * | 1/2007 | Ginzburg et al. ............ | 708/523 |
| 2007/0076597 | A1 * | 4/2007 | Barak et al. ................. | 370/229 |

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 531 pages.

IEEE P802.11g/D8.2, Apr. 2003 (Supplement to ANSI/IEEE Std 802.11—1999(Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

(Continued)

*Primary Examiner*—Charles N Appiah
*Assistant Examiner*—Olumide T Ajibade Akonai (57) ABSTRACT

A wireless network device includes a first media access controller (MAC) that generates a first output signal, a second MAC that generates a second output signal, and a communication channel. The communication channel includes a baseband processor in communication with a radio frequency transmitter and selectively transmits one of the first output signal and the second output signal.

14 Claims, 6 Drawing Sheets

OTHER PUBLICATIONS 802.11n; IEEE P802.11-04/0889r6; Wireless LANs, TGn Sync Proposal Technical Specification; 131 pages.

IEEE Std 802.11a-1999 (Supplement to IEEE Std 802.11-1999) [Adopted by ISO/IEC and redesignated as ISO/IEC 8802-11: 1999/Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE 802.20-PD-06, IEEE P 802.20 V14, Jul. 16, 2004, Draft 802.20 Permanent Document, System Requirements for IEEE 802.20 Mobile Broadband Wireless Access Systems—Version 14, 24 pages.

IEEE Std 802.16-2004 (Revision of IEEE Std 802.16-2001) IEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

PCT International Search Report and Written Opinion dated Jul. 13, 2007 for International Application No. PCT/US2007/003717; 8 pages.

Rai, Satyajit; "Design and Evaluation of an IEEE 802.11 Based Dual MAC for MANETS"; Dissertation; Jan. 15, 2003; 39 pages.

* cited by examiner

DUAL MAC ARBITRATION

FIELD OF THE INVENTION

The present invention relates to wireless networks, and more particularly to implementing multiple access points in a single device.

BACKGROUND OF THE INVENTION

Figure 1:
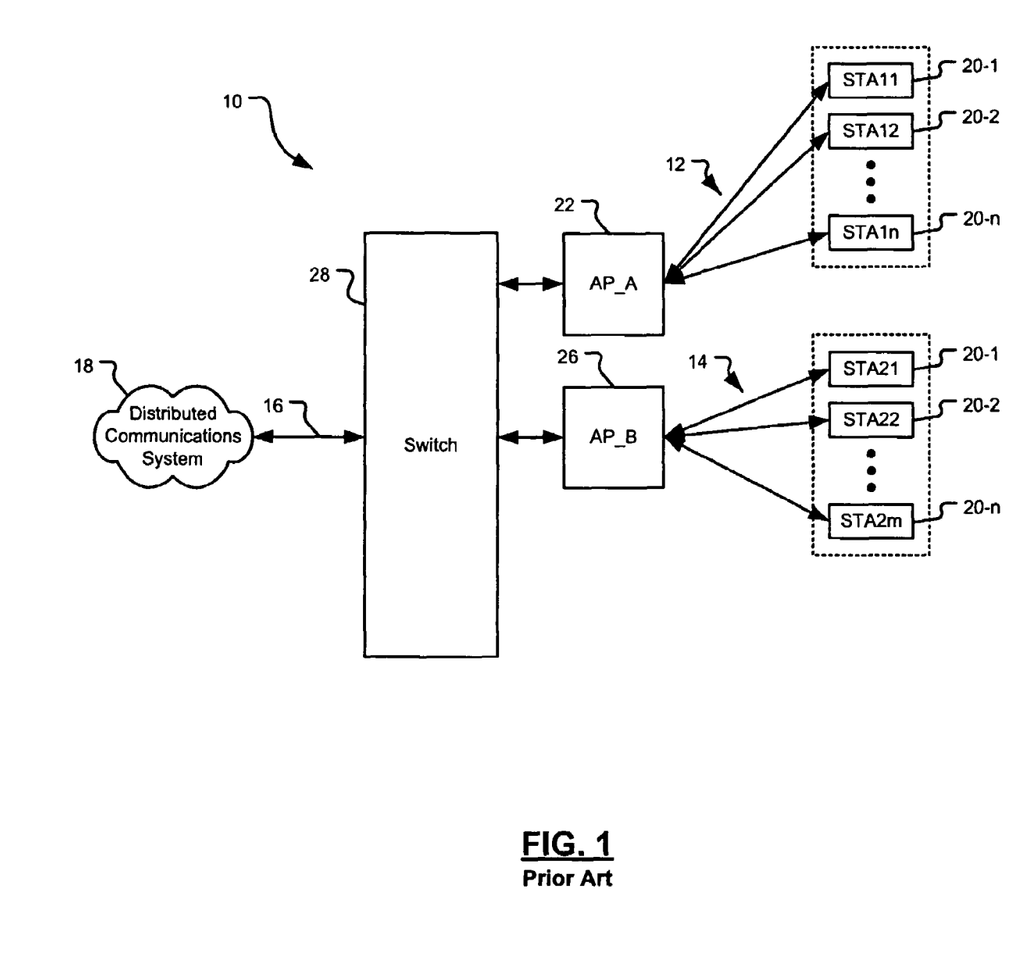
FIG. 1 is a functional block diagram of an internetwork of the prior art.

Referring now to FIG. 1, an internetwork 10 is shown that includes a first subnetwork 12, a second subnetwork 14, and a connection 16 to a distributed communications system 18, such as the Internet. First subnetwork 12 includes a plurality of wireless stations 20-1, 20-2, . . . , 20-$n$ that are associated with a first wireless access point (AP_A) 22. Second subnetwork 14 includes a plurality of wireless stations 24-1, 24-2, . . . , 24-$m$ that are associated with a second wireless access point (AP_B) 26. AP_A 22 and AP_B 26 communicate with a switch 28 that routes data packets between first network 12, second network 14 and distributed communications system 10.

Internetwork 10 is of typical construction in that AP_A 22 and AP_B 26 each include, in pertinent part, a media access controller (MAC) and a physical layer module (PHY) to form and communicate data packets over the wireless channel.

SUMMARY OF THE INVENTION

A wireless network device includes a first media access controller (MAC) that generates a first output signal, a second MAC that generates a second output signal, and a communication channel. The communication channel includes a baseband processor in communication with a radio frequency transmitter and selectively transmits one of the first output signal and the second output signal.

In other features the wireless network device includes a switch that routes one of the first output signal and the second output signal to the communication channel in accordance with a select signal. The communication channel generates a clear channel assessment signal that is communicated to the first MAC and the second MAC and determines when the first and second output signals can be generated.

In other features an arbitration circuit determines which of the first output signal and the second output signal is transmitted by the communication channel. The determination is made based on a priority relationship between the first MAC and the second MAC. The first MAC and the second MAC generate respective first and second request signals that are communicated to the arbitration module. The first and second request signals indicate that the respective one of the first and second MACs desires to generate its respective one of the first and second output signals.

In other features the arbitration module generates a first drop signal that is communicated to the first MAC and generates a second drop signal that is communicated to the second MAC. The first MAC and the second MAC each include a queue for data to be output through their respective first and second output signals. The first MAC and second MAC flush the data from their respective queue upon receiving their respective one of the first drop signal and the second drop signal.

In other features the communication channel is otherwise compliant with at least one of the Institute of Electrical and Electronics Engineers (IEEE) standards 802.11, 802.11a, 802.11b, 802.11g, 802.11h, 802.11n, 802.16, and 802.20 and the Bluetooth standard issued by the Bluetooth Special Interest Group (SIG).

A wireless network device includes first media access controller (MAC) means for generating a first output signal, second MAC means for generating a second output signal, and communication channel means including baseband processor means for communicating a selected one of the first and second output signals to radio frequency transmitting means for transmitting a radio-frequency modulated carrier based on the selected one of the first and second output signals.

In other features the wireless network device includes switch means for routing the selected one of the first and second output signals to the communication channel means in accordance with a select signal. The communication channel means generates a clear channel assessment signal that is communicated to the first MAC means and the second MAC means and determines when the first and second output signals can be generated.

In other features the wireless network device includes arbitration means for determining which of the first output signal and the second output signal is transmitted by the communication channel means. The determination is made based on a priority relationship between the first MAC means and the second MAC means. The first MAC means and the second MAC means generate respective first and second request signals that are communicated to the arbitration means. The first and second request signals indicate that the respective one of the first and second MAC means desires to generate its respective one of the first and second output signals.

In other features the arbitration means generates a first drop signal that is communicated to the first MAC means and generates a second drop signal that is communicated to the second MAC means. The first MAC means and the second MAC means each include queue means for queuing data to be output through their respective first and second output signals. The first MAC means and second MAC means flushes the data from their respective queue means upon receiving their respective one of the first drop signal and the second drop signal.

In other features the communication channel means is otherwise compliant with at least one of the Institute of Electrical and Electronics Engineers (IEEE) standards 802.11, 802.11a, 802.11b, 802.11g, 802.11h, 802.11n, 802.16, and 802.20 and the Bluetooth standard issued by the Bluetooth Special Interest Group (SIG).

A method for generating a transmit signal in a wireless network device includes providing a first media access controller (MAC) that generates a first output signal in accordance with a first wireless network protocol, providing a second MAC that generates a second output signal in accordance with a second wireless network protocol, transmitting the first data packets and the second data packets from a common transmitter.

In other features the method includes generating a select signal and routing one of the first and second output signals to the transmitting step in accordance with the select signal. The method also includes receiving a wireless network signal, generating a clear channel assessment signal that indicates one of the receiving and transmitting steps are executing; and generating the first and second output signal based on the clear channel assessment signal.

In other features the method includes determining which of the first and second output signals is transmitted during the transmitting step based on a priority relationship between the first and second output signals. The method includes generating first and second request signals associated with respective ones of the first and second output signals, and asserting respective ones of the first and second request signals in association with generating the respective ones of the first and second output signals.

In other features the method includes generating first and second drop signals associated with respective ones of the first and second output signals, maintaining first and second queues for data to be included in respective ones of the first and second output signals, and flushing a respective one of the first and second queues in response to a respective one of the first and second drop signals.

In other features the transmitting step is otherwise compliant with at least one of the Institute of Electrical and Electronics Engineers (IEEE) standards 802.11, 802.11a, 802.11b, 802.11g, 802.11h, 802.11n, 802.16, and 802.20 and the Bluetooth standard issued by the Bluetooth Special Interest Group (SIG).

In other features the first wireless network protocol is different from the second wireless network protocol. The first wireless network protocol includes an ad-hoc networking protocol and the second wireless network protocol includes an infrastructure mode protocol.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or or suitable components that provide the described functionality. As used herein, the phrase at least one of A, B, and C should be construed to mean a logical (A or B or C), using a non-exclusive logical or. It should be understood that steps within a method may be executed in different order without altering the principles of the present invention.

Figure 2:
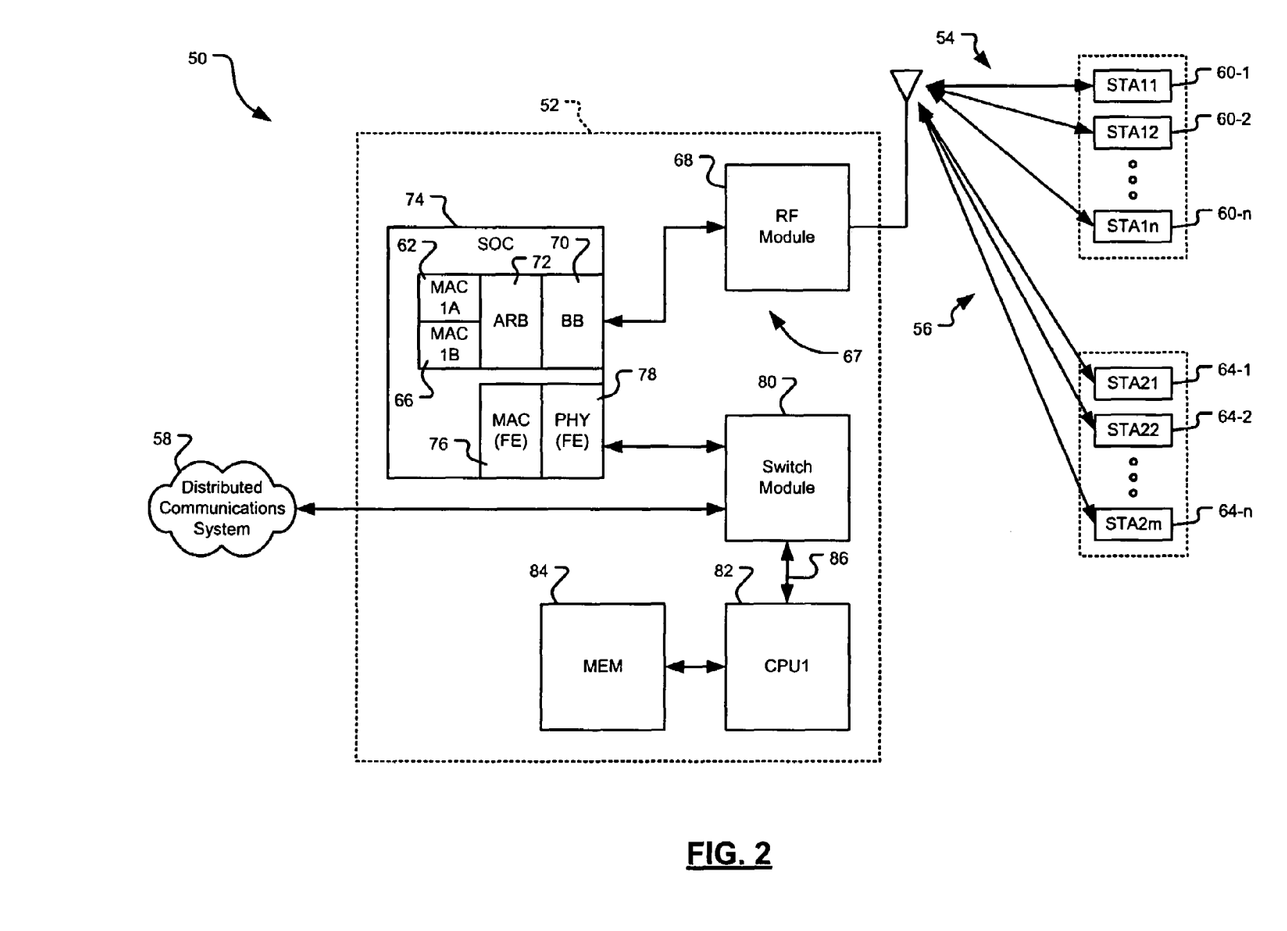
FIG. 2 is a functional block diagram of an improved internetwork.

Referring now to FIG. 2, an improved internetwork 50 is shown. Internetwork 50 includes a networked appliance 52 that communicates with a first subnetwork 54, a second subnetwork 56, and a distributed communications system 58, such as the Internet. In an example configuration, networked appliance 52 can be an audio/visual entertainment system. In the example configuration, first subnetwork 54 communicates real-time control data between remote control devices and second subnetwork 56 provides a wireless access point (WAP) to distributed communications system 58. First subnetwork 54 and second subnetwork 56 can be configured to use different network modes. For example, first subnetwork 54 can be configured in an ad-hoc mode, and second subnetwork 56 can be configured in an infrastructure mode.

Wireless networking protocols that may be used with first subnetwork 54 and second subnetwork 56 include the Institute of Electrical and Electronics Engineers (IEEE) standards 802.11, 802.11a, 802.11b, 802.11g, 802.11h, 802.11n, 802.16, and 802.20. First subnetwork 54 and second subnetwork 56 can also be operated as personal area networks such as Bluetooth. A Bluetooth standard is published by the Bluetooth Special Interest Group (SIG). The aforementioned standards are hereby incorporated by reference in their entirety.

First subnetwork 54 includes a plurality of wireless stations (STAs) 60-1, 60-2, . . . , 60-*n*, referred to collectively as STAs 60, that are associated with a first media access controller (MAC1A) 62. Second subnetwork 56 includes a plurality of wireless stations 64-1, 64-2, . . . , 64-*m*, referred to collectively as STAs 64, that are associated with a second media access controller (MAC1B) 66.

STAs 60 and 64 communicate with MAC1A 62 and MAC1B 66 through a communication channel 67 that includes an RF module 68 and a baseband processor 70. An arbitration module 72 allows MAC1A 62 and MAC1B 66 to transmit through the single communication channel 67 as described below. MAC1A 62, MAC1B 66, arbitration module 72, and baseband processor 70 can be implemented as part of a system-on-chip (SOC) 74.

MAC1A 62 and MAC1B 66 communicate with distributed communications system 58 through a third MAC 76, PHY 78, and a network switch 80. PHY 78 and switch 80 can be compatible with a copper and/or fiber-optic Ethernet connection. In one embodiment, PHY 78 and switch 80 are compatible with a 100-BASET Fast Ethernet (FE) connection. MAC 76 and PHY 78 can also be implemented on SOC 74, which can also include other components as will be described later.

Networked appliance 52 can also include a first central processor unit (CPU1) 82 and memory 84. Memory 84 stores computer programs such as operating systems and/or applications for operating networked appliance 52. CPU1 82 executes the computer programs stored in memory 84. CPU1 82 also includes a network link 86 that communicates with network switch 80. Network link 86 allows CPU1 82 to communicate with SOC 52, first subnetwork 54, second subnetwork 56, and distributed communications system 58.

Figure 3:
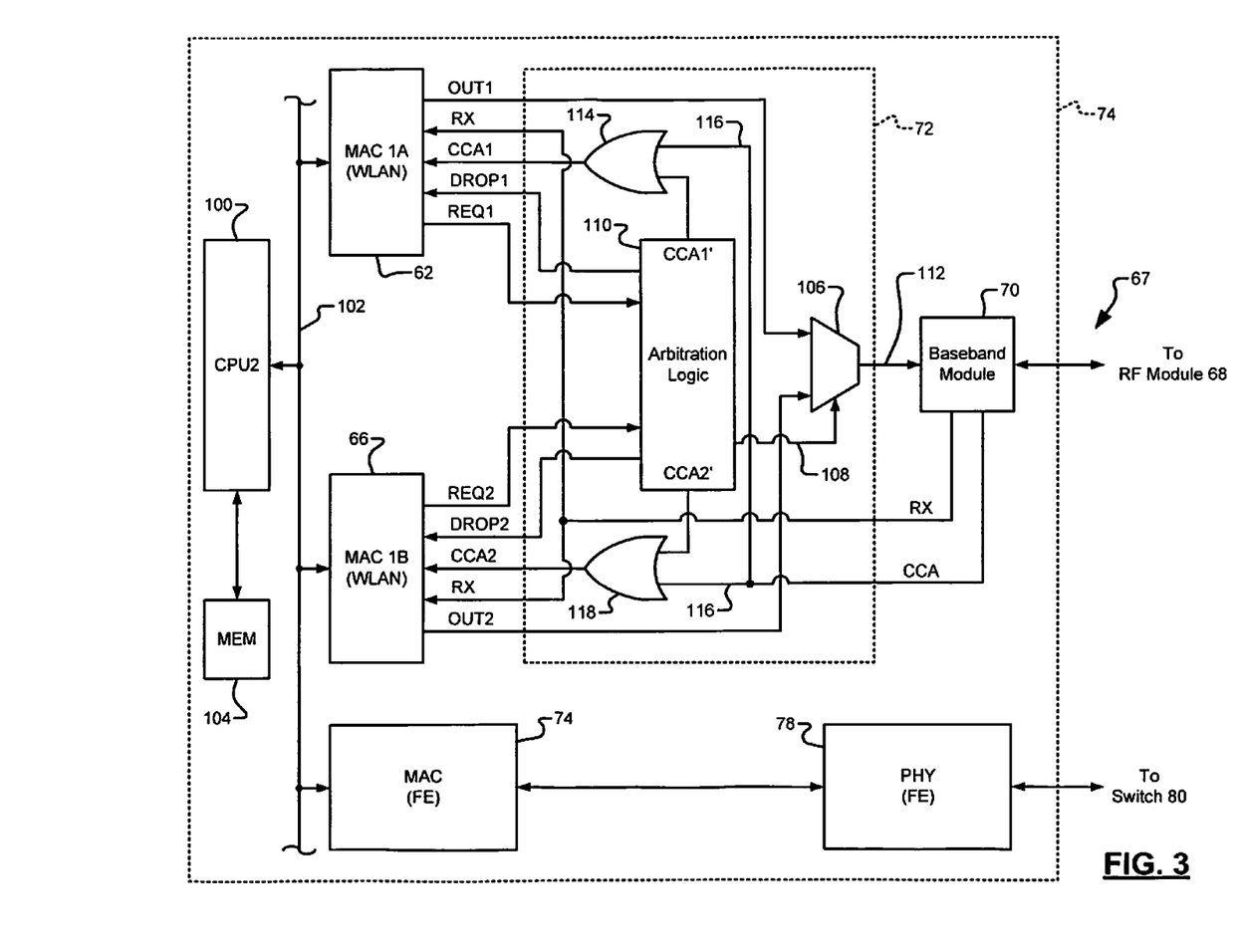
FIG. 3 is a functional block diagram of a system-on-chip (SOC)

Referring now to FIG. 3, SOC 74 is shown in additional detail. SOC 74 can include a second central processor unit (CPU2) 100 that communicates with MAC1A 62, MAC1B 66, and MAC 76 through an internal bus 102. CPU2 100 routes data packets between MAC1A 62, MAC1B 66, and MAC 76 and is associated with memory 104 that stores one or more computer programs related to routing the data packets.

Arbitration module 72 provides flow control logic for data packets transmitted from an OUT1 port of MAC1A 62 and an OUT2 port of MAC1B 66. Arbitration module 72 includes a switch module 106 that receives data packets from OUT1 and OUT2 and selectively communicates one of them to an output 112 in accordance with a select signal 108. An arbitration logic circuit 110 selects the MAC1A 62 and MAC1B 66 that gets access to communication channel 67 and generates select signal 108 accordingly. In one embodiment, arbitration logic circuit 110 determines priority between MAC1A 62 and MAC1B 66 according to a predetermined hierarchy. For example, arbitration logic circuit 110 can be configured to give priority to MAC1A 62 over MAC1B 66.

Arbitration module 72 generates a first clear channel assessment signal CCA1 and a second clear channel assessment signal CCA2. The CCA1 signal is applied to MAC1A 62 and the CCA2 signal is applied to MAC1B 66. The signals CCA1 and CCA2 change state (such as go low) to indicate the MAC1A 62 and MAC1B 66 that has access to communication channel 67 and change state (such as go high) to indicate that communication channel 67 is unavailable to the respective MAC1A 62 and MAC1B 66.

A first OR-gate 114 generates the CCA1 signal. First OR-gate 114 includes a first input that receives a CCA1' signal from arbitration logic circuit 110 and a second input that receives a CCA signal 116 from baseband module 70. Arbitration logic circuit 110 drives the CCA1' signal low when MAC1A 62 is granted access to communication channel 67 and drives the CCA1' signal high when MAC1A 62 is not granted access to communication channel 67. Baseband module 70 drives CCA signal 116 high when communication channel 67 is busy transmitting or receiving and drives CCA signal 116 low when communication channel 67 is clear.

A second OR-gate 118 generates the CCA2 signal. Second OR-gate 118 includes a first input that receives a CCA2' signal from arbitration logic circuit 110 and second input that receives CCA signal 116 from baseband module 70. Arbitration logic circuit 110 drives the CCA2' signal when MAC1B 66 is granted access to communication channel 67 and drives the CCA2' signal high when MAC1A 62 is not granted access to communication channel 67.

In general, second OR-gate 118 drives the CCA2 signal high when MAC1A 62 is granted permission to transmit over communication channel 67 and drives CCA2 low after MAC1A 62 finishes transmitting. First OR-gate 114 drives the CCA1 signal high when MAC1B 66 is granted permission to transmit over communication channel 67 and drives CCA1 low after MAC1B 66 finishes transmitting.

MAC1A 62 and MAC1B 66 include respective internal transmit queues and assert respective request signals REQ1 and REQ2 when their respective queue contains data to be transmitted. The REQ1 and REQ2 signals are applied to arbitration logic circuit 110. Upon receiving an asserted REQ1 or REQ2 signal, arbitration module 72 executes methods that are described below. A first method (FIG. 4) determines whether one of MAC1A 62 and MAC1B 66 may access communication channel 67. A second method (FIG. 5) determines whether arbitration logic circuit 110 should instruct MAC1A 62 and/or MAC1B to flush its respective queue and thereby drop the packet (dropped packets can be retried and/or re-sent according to a selected wireless protocol). Arbitration logic circuit 110 generates a DROP1 signal that is communicated to MAC1A 62 and generates a DROP2 signal that is communicated to MAC1B 66. The DROP1 and DROP2 signals are asserted to indicate that the respective one of MAC1A 62 and MAC1B 66 should flush the data packet from its respective queue. MAC1A 62 and MAC1B 66 simultaneously receive data from communication channel 67 channel via an RX port 118 that is driven by baseband module 70.

Figure 4:
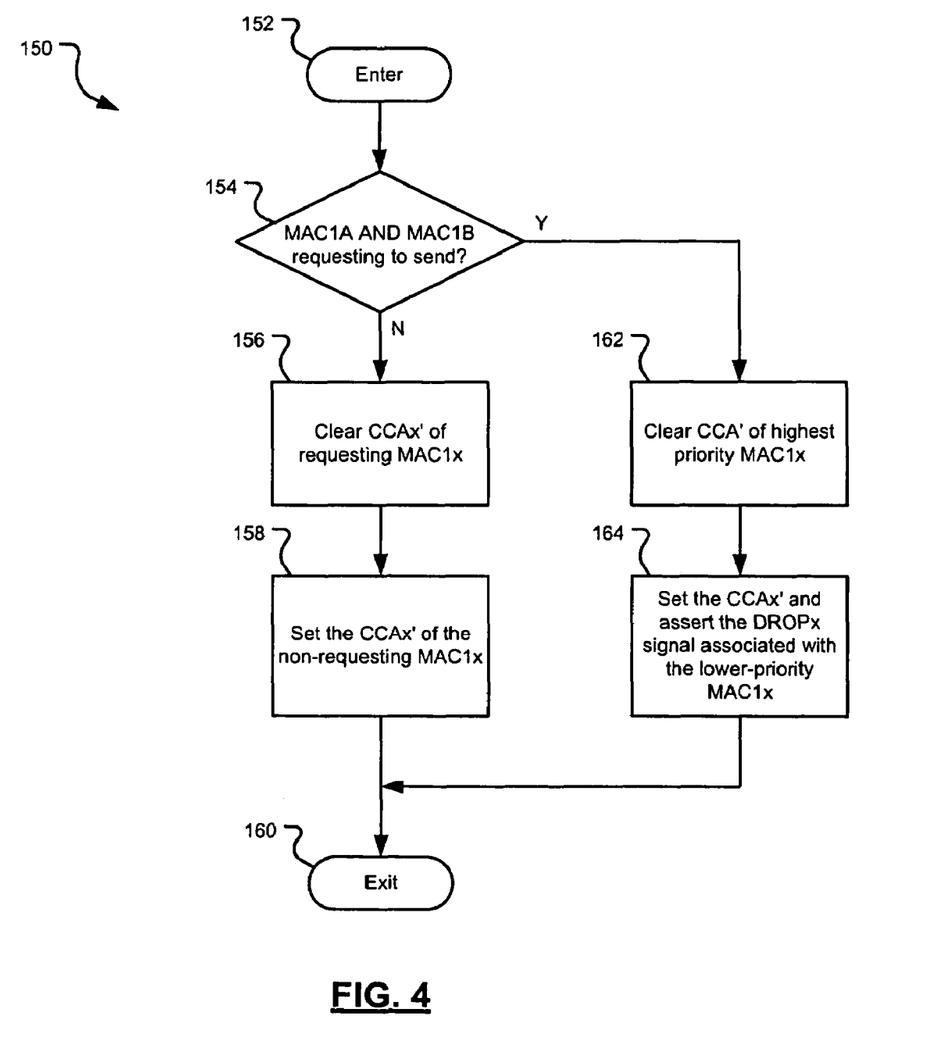
FIG. 4 is a flowchart of a method for controlling access to a communication channel of the SOC.

Referring now to FIG. 4, a method 150 is shown for determining which of MAC1A 62 and MAC1B 66 is granted access to communication channel 67. Method 150 can be executed by a central processing unit and/or a logic circuit included in arbitration logic circuit 110. Method 150 is executed when MAC1A 62 and/or MAC1B 66 asserts its associated request signal REQ1, REQ2.

Control begins in block 152 and proceeds to decision block 154. In decision block 154, control determines whether REQ1 and REQ2 are being asserted simultaneously. If not, control branches to block 156 and clears CCA1' if MAC1A is requesting or clears CCA2' if MAC1B is requesting. Control then proceeds to block 158 sets the CCAx' signal of the non-requesting MAC1x so that it does not transmit while the requesting MAC1x is transmitting. Control then exits through exit block 160.

Returning now to decision block 154, if MAC1A and MAC1B are simultaneously requesting to send then control branches to block 162. In block 162 control clears CCA1' if MAC1A has higher priority than MAC1B. If MAC1A has lower priority than MAC1B then control clears CCA2'. Control then proceeds to block 164 and asserts the DROPx signal associated with the non-requesitng MAC1x, thereby causing it to flush its queue. Control also sets the CCAx' signal of the non-requesting MAC1x so that it does not transmit while the requesting MAC1x is transmitting. Control then exits through exit block 160.

Figure 5A:
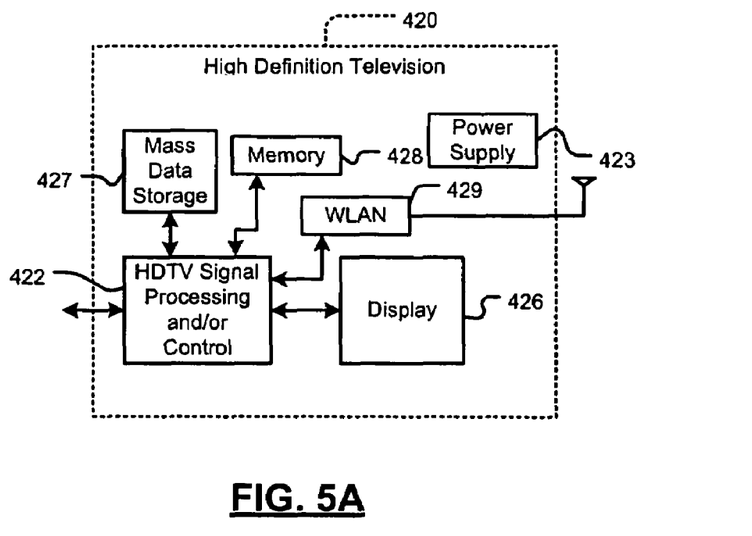
FIG. 5A is a functional block diagram of a high definition television.

Referring now to FIGS. 5A-5D, various exemplary implementations of the present invention are shown. Referring now to FIG. 5A, the present invention can be implemented in a high definition television (HDTV) 420. The present invention may implement and/or be implemented in a WLAN interface 429. The HDTV 420 also includes signal processing and/or control circuits, which are generally identified at 422, that communicate with the WLAN interface 429. The signal processing and/or control circuits 422 also communicate with mass data storage 427.

The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The mass data storage 427 stores data in a nonvolatile manner such as optical and/or magnetic storage devices. At least one of the magnetic storage devices may be a mini hard disk drive (mini HDD) that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a plurality of WLANs via a WLAN network interface 429.

The HDTV 420 may include a power supply and/or power conditioning circuit 423 that applies power to the other components of the HDTV 420.

Figure 5B:
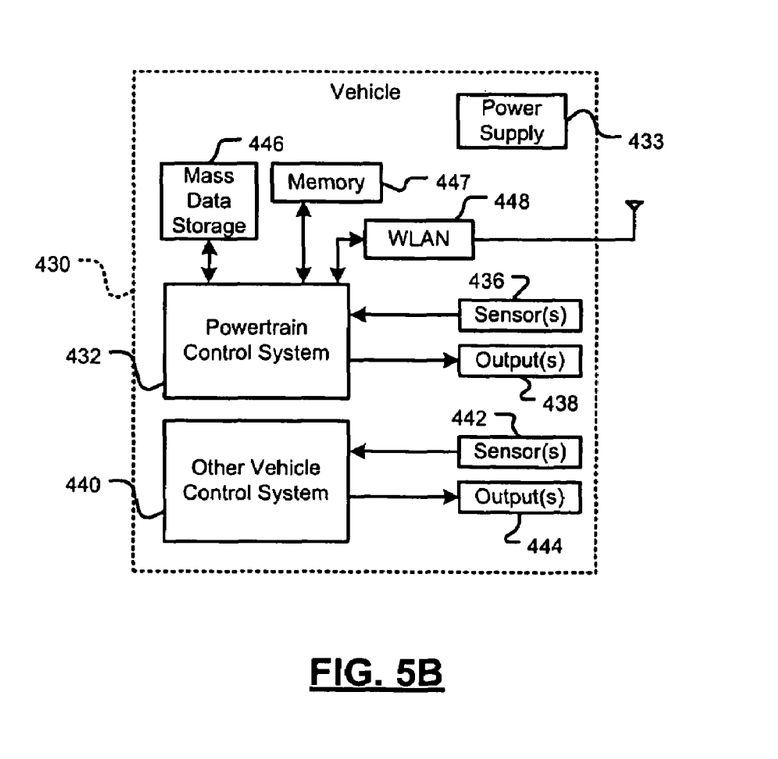
FIG. 5B is a functional block diagram of a vehicle control system.

Referring now to FIG. 5B, the present invention may implement and/or be implemented in a WLAN interface 448 of a vehicle 430. The WLAN interface 448 communicates with one or more vehicle control systems, mass data storage of the vehicle control system and/or a power supply 433. In some implementations, the vehicle control systems include a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The vehicle control systems may also include other control systems 440 of the vehicle 430. The control systems 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices for example hard disk drives (HDDs) and/or DVDs. At least one of the magnetic storage devices may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a plurality of WLANs via WLAN network interface 448. The control system 440 may also include memory 447.

Figure 5C:
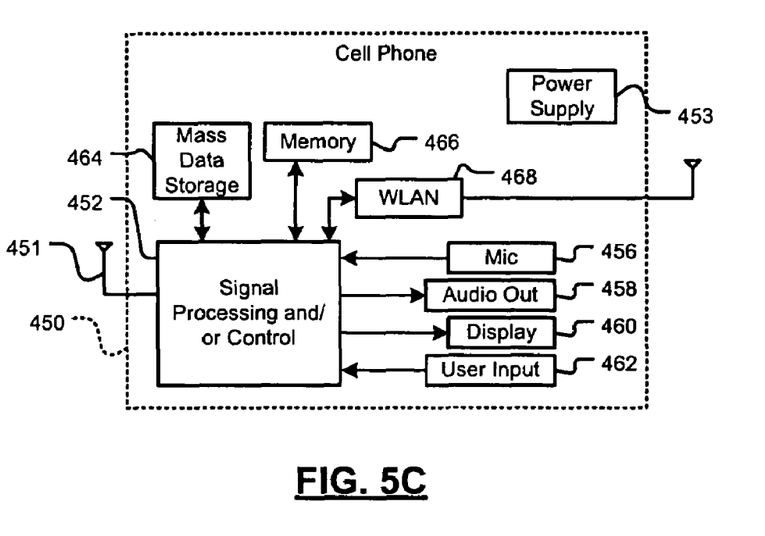
FIG. 5C is a functional block diagram of a cellular phone.

Referring now to FIG. 5C, the present invention can be implemented in a cellular phone 450 that may include a cellular antenna 451. The present invention may implement and/or be implemented in WLAN interface 468. The WLAN interface 468 communicates with either or both signal processing and/or control circuits, which are generally identified in FIG. 5C at 452. The cellular phone 450 may also include mass data storage 464 and/or a power supply 453. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with the mass data storage 464 to store data in a nonvolatile manner such as on optical and/or magnetic storage devices for example hard disk drives (HDDs) and/or DVDs. At least one of the magnetic storage devices may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage.

Figure 5D:
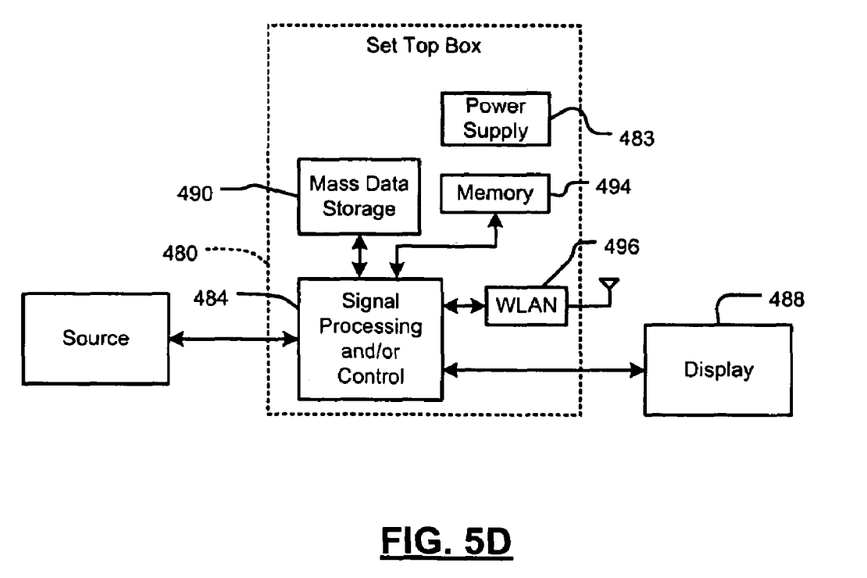
FIG. 5D is a functional block diagram of a set top box.

Referring now to FIG. 5D, the present invention can be implemented in a set top box 480. The present invention may implement and/or be implemented in a WLAN interface 496, which communicates with either or both signal processing and/or control circuits generally identified at 484. The control circuits 484 can also communicate with mass data storage 490 of the set top box 480 and/or a power supply 483. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices for example hard disk drives (HDDs) and/or DVDs. At least one of the magnetic storage devices may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a plurality of WLANs via a WLAN network interface 496. Still other implementations in addition to those described above are contemplated.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A wireless network device comprising:
   a first media access controller (MAC) that generates a first output signal;
   a second MAC that generates a second output signal;
   an arbitration circuit that selects one of the first output signal and the second output signal based on a priority relationship between the first MAC and the second MAC; and
   a physical layer module that transmits the selected one of the first output signal and the second output signal, and that generates a clear channel assessment (CCA) signal,
   wherein the arbitration circuit generates a first CCA signal and a second CCA signal based on the CCA signal, and wherein the first CCA signal and the second CCA signal determine when the first output signal and the second output signal are generated, respectively,
   wherein the first MAC and the second MAC include a first output queue and a second output queue, respectively,
   wherein the arbitration circuit selectively generates a first drop signal and a second drop signal, and
   wherein the first MAC and the second MAC flush the first output queue and the second output queue, respectively, in response to the first drop signal and the second drop signal, respectively.

2. The wireless network device of claim 1 further comprising a switch that routes one of the first output signal and the second output signal to the physical layer module in accordance with a select signal.

3. The wireless network device of claim 1 wherein the first MAC and the second MAC respectively generate a first request signal and a second request signal that are communicated to the arbitration circuit; and
   wherein the first request signal and the second request signal respectively indicate a desire of the first MAC and the second MAC to respectively generate the first output signal and the second output signal.

4. The wireless network device of claim 1 wherein the physical layer module is otherwise compliant with at least one of the Institute of Electrical and Electronics Engineers (IEEE) standards 802.11, 802.11a, 802.11b, 802.11g, 802.11h, 802.11n, 802.16, and 802.20 and the Bluetooth standard issued by the Bluetooth Special Interest Group (SIG).

5. A wireless network device comprising:
   first media access controller (MAC) means for generating a first output signal;

second MAC means for generating a second output signal;

arbitration means for selecting one of the first output signal and the second output signal based on a priority relationship between the first MAC and the second MAC; and physical layer means for transmitting a radio-frequency modulated carrier based on the selected one of the first output signal and the second output signal, and for generating a clear channel assessment (CCA) signal, wherein the arbitration means generates a first CCA signal and a second CCA signal based on the CCA signal, wherein the first CCA signal and the second CCA signal determine when the first output signal and the second output signal are generated, respectively, wherein the first MAC means and the second MAC means include a first queuing means and a second queuing means, respectively, for queuing data to be output through the first output signal and the second output signal, respectively, wherein the arbitration means selectively generates a first drop signal and a second drop signal, and wherein the first MAC means and the second MAC means flush the first queuing means and the second queuing means, respectively, in response to the first drop signal and the second drop signal, respectively.

6. The wireless network device of claim 5 further comprising switch means for routing the selected one of the first output signal and the second output signal to the physical layer means in accordance with a select signal.

7. The wireless network device of claim 5 wherein the first MAC means and the second MAC means respectively generate a first request signal and a second request signal that are communicated to the arbitration means; and wherein the first request signal and the second request signal respectively indicate a desire of the first MAC means and the second MAC means to respectively generate the first output signal and the second outputs signal.

8. The wireless network device of claim 5 wherein the physical layer means is otherwise compliant with at least one of the Institute of Electrical and Electronics Engineers (IEEE) standards 802.11, 802.11a, 802.11b, 802.11g, 802.11h, 802.11n, 802.16, and 802.20 and the Bluetooth standard issued by the Bluetooth Special Interest Group (SIG).

9. A method for generating a transmit signal in a wireless network device, comprising:

providing a first media access controller (MAC) that generates a first output signal in accordance with a first wireless network protocol;

providing a second MAC that generates a second output signal in accordance with a second wireless network protocol;

selecting one of the first output signal and the second output signal based on a priority relationship between the first MAC and the second MAC;

transmitting the selected one of the first output signal and the second output signal using a common transmitter;

generating a clear channel assessment (CCA) signal;

generating a first CCA signal and a second CCA signal based on the CCA signal, wherein the first CCA signal and the second CCA signal determine when the first output signal and the second output signal are generated, respectively;

maintaining a first queue and a second queue for data to be outputted by the first output signal and the second output signal, respectively;

selectively generating a first drop signal and a second drop signal; and flushing the first queue and the second queue in response to the first drop signal and the second drop signal, respectively.

10. The method of claim 9 further comprising generating a select signal and routing one of the first output signal and the second output signal to the common transmitter in accordance with the select signal.

11. The method of claim 9 further comprising generating a first request signal and a second request signal associated with the first second output signal and the second output signal, respectively; and asserting the first request signal and the second request signal in association with generating the first output signal and the second outputs signal, respectively.

12. The method of claim 9 wherein the transmitting step is otherwise compliant with at least one of the Institute of Electrical and Electronics Engineers (IEEE) standards 802.11, 802.11a, 802.11b, 802.11g, 802.11h, 802.11n, 802.16, and 802.20 and the Bluetooth standard issued by the Bluetooth Special Interest Group (SIG).

13. The method of claim 9 wherein the first wireless network protocol is different from the second wireless network protocol.

14. The method of claim 13 wherein the first wireless network protocol includes an ad-hoc networking protocol and the second wireless network protocol includes an infrastructure mode protocol.

* * * * *